United States Patent Office 3,546,225
Patented Dec. 8, 1970

3,546,225
7,8-DIMETHOXY-2-OXOPYRIMIDO[1,2-a]INDOLES
Vasken Paragamian, Dresher, Pa., assignor to McNeil Laboratories, Incorporated, a corporation of Pennsylvania
No Drawing. Filed Oct. 11, 1967, Ser. No. 674,629
Int. Cl. C07d 51/46
U.S. Cl. 260—251                    15 Claims

ABSTRACT OF THE DISCLOSURE

The compounds are of the class of 3-carbethoxy-7,8-dimethoxypyrimido[1,2-a]indole-2(IH)-ones and 1,2,3,4-tetrahydro-7,8-dimethoxy - 2-oxopyrimido - [1,2-a]indole carboxylates and carboxylic acids, useful for their ultraviolet absorption properties. A novel method for preparing 3-carbalkoxy-pyrimido-[1,2-a]indole-2(1H)-ones is provided by treating dialkyl [(2-cyanomethyl-4,5-dimethoxy)anilino]-methylenemalonate with sodium ethoxide in refluxing ethanol.

This invention relates to a new series of compounds. More particularly, it concerns certain substituted pyrimido[1,2-a]indoles which may be represented by the formula:

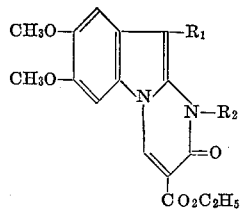

in which $R_1$ is a member selected from the group consisting of hydrogen, lower alkyl, —$CH_2CO_2H$, and —$CH_2$-$CO_2$-lower alkyl; and $R_2$ is a member selected from the group consisting of hydrogen, —$CH_2CO_2H$ and —$CH_2$-$CO_2$-lower alkyl; provided that at least one of said $R_1$ and said $R_2$ is hydrogen and the formula:

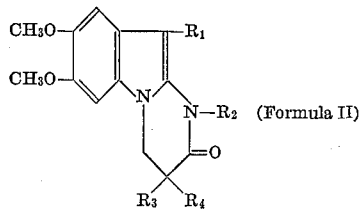

in which $R_1$ is a member selected from the group consisting of hydrogen, loweralkyl, —$CH_2CO_2H$, —$CH_2CO_2$-loweralkyl; $R_2$ is a member selected from the group consisting of hydrogen loweralkyl, —$CH_2CO_2H$, —$CH_2CO_2$-loweralkyl and —$CH_2CH_2CN$; and $R_3$ and $R_4$ are members selected from the group consisting of hydrogen, —$CH_2CH_2CN$ and —$CO_2C_2H_5$, wherein when $R_3$ is hydrogen, $R_4$ is a member selected from the group consisting of —$CH_2CH_2CN$ and —$CO_2C_2H_5$.

As used herein, loweralkyl may be straight or branch chained and have from 1 to 4 carbon atoms, such as, for example, methyl, ethyl, propyl, isopropyl, butyl, isobutyl, tertiary butyl and the like.

The compounds of this invention absorb ultraviolet light and are useful as sun-screening materials in salves and ointments. In addition, because of their solubility in organic materials generally, they may be used as ultraviolet absorbers in plastics and resins, such as polystyrene, polyethylene, polypropylene, polyacrylics (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultraviolet light, such as in plastic film or light filters. The absorber may be incorporated in the mixtures of monomers before polymerization to form the polymer or it may be incorporated in the polymer at any stage during its handling, as by milling into the polymer together with other compounding ingredients or during the spinning of polymers into fibers, etc.

The compounds of the present invention may be derived from the intermediate, diethyl-[(2-cyanomethyl-4,5-dimethoxy)anilino]methylenemalonate (Compound A) which is prepared by reacting (2-amino-4,5-dimethoxyphenyl)acetonitrile with diethyl ethoxymethylenemalonate, preferably in a suitable solvent, such as benzene, toluene or xylene.

3-carbethoxy-7,8-dimethoxypyrimido[1,2 - a]indole-2-(1H)-one (Compound B) may be prepared by reacting Compound A with an appropriate base in a suitable solvent such as sodium ethoxide in refluxing ethanol, and then acidifying the thus-obtained sodium salt of Compound B sodium hydride in benzene or 1,2-dimethoxyethane.

Ethyl 1,2,3,4-tetrahydro-7,8-dimethoxy - 2-oxopyrimido [1,2-a]indole-3-carboxylate (Compound C) may be prepared by hydrogenating Compound B over a suitable catalyst such as platinum, palladium or nickel in an alcoholic solvent such as methanol, or ethanol, or in a neutral solvent such as ethyl acetate.

Ethyl 1,3-bis(2-cyanoethyl) - 1,2,3,4-tetrahydro-7,8-dimethoxy - 3 - oxopyrimido[1,2 - a]indole - 3 - carboxylate (Compound D) may be prepared by reacting Compound C with acrylonitrile in the presence of a suitable base such as a tertiary amine in an alcoholic solvent such as ethanol or propanol.

Ethyl 3-carbethoxy-1,2-dihydro - 7,8-dimethoxy-2-oxopyrimido[1,2-a]indole-10-acetate (Compound E) may be prepared by reacting the sodium salt of Compound B with ethyl bromoacetate in an alcoholic solvent, such as ethanol. After removing Compound E from the reaction mixture by filtration, the compound, ethyl 3-carbethoxy-1,2-dihydro-7,8-dimethoxy-2-oxopyrimido[1,2 - a]indole-1-acetate (Compound F) seperates from the filtrate upon standing overnight and is recovered therefrom. Alternatively, Compound B may be reacted with ethyl bromoacetate in the presence of a suitable base such as sodium ethoxide or sodium hydride in solvents such as dimethylformamide or 1,2-dimethoxyethane.

Other alkyl esters of Compound E may be prepared by replacing ethyl bromoacetate with an equivalent of the appropriate alkyl bromoacetate.

Ethyl 3-carbethoxy-1,2,3,4-tetrahydro-7,8-dimethoxy-2-oxopyrimido[1,2-a]indole-10-acetate (Compound G) may be prepared by hydrogenating Compound E over a suitable catalyst such as platinum, palladium or nickel in an alcoholic solvent such as methanol or ethanol, or in a neutral solvent such as ethyl acetate.

The 1-acetic acid derivative (Compound H) of Compound F may be prepared by reacting Compound F with a mineral acid such as hydrochloric acid in a water- miscible solvent such as 1,2-dimethoxyethane or dioxane.

The 10-acetic acid derivative of Compound E may be prepared by first preparing tertiary butyl 3-carbethoxy-1,2-dihydro-7,8-dimethoxy - 2-oxopyrimido[1,2-a]indole-10-acetate, for example, by reacting the sodium salt of Compound B with tertiary butyl bromoacetate in a suitable solvent, such as absolute alcohol. The tertiary butyl ester may then be hydrolyzed by refluxing in benzene with p-toluenesulfonic acid or benzene sulfonic acid to form 3-carbethoxy-1,2-dihydro - 7,8-dimethoxy-2-oxopyrimido[1,2-a]indole-10-acetic acid.

3-carbethoxy - 1,2,3,4 - tetrahydro - 7,8 - dimethoxy-2-oxopyrimido[1,2-a]indole-1-acetic acid may be prepared by hydrogenating Compound H over a suitable catalyst such as platinum, palladium or nickel in an alcoholic solvent such as methanol or ethanol, or in a neutral solvent such as ethyl acetate.

Ethyl 3-carbethoxy - 1,2,3,4-tetrahydro-7,8-dimethoxy-2-oxopyrimido[1,2-a]indole-1-acetate may be prepared by hydrogenating Compound F over a suitable catalyst such as platinum, palladium or nickel in an alcoholic solvent such as methanol or ethanol, or in a neutral solvent such as ethyl acetate.

1,2,3,4-tetrahydro-7,8-dimethoxy-2-oxopyrimido[1,2-a]indole-1,3-dipropionitrile may be prepared by saponifying Compound D with an alkali metal hydroxide such as sodium or potassium hydroxide in an aqueous alcoholic solvent such as aqueous alcohol and acidifying the resulting mixture with a mineral acid such as hydrochloric acid.

3-carbethoxy-7,8-dimethoxy-10-methyl-pyrimido[1,2-a]indole-2(1H)-one may be prepared by reacting (2-nitro-4,5-dimethoxyphenyl) acetonitrile with methyl iodide in the presence of a suitable base in a suitable solvent, for example, sodium ethoxide in ethanol or sodium hydride in benzene or 1,2-dimethylethane, reducing the resulting α-[(2-nitro-4,5-dimethoxyphenyl)]propionitrile over a suitable catalyst such as platinum, palladium or nickel in an alcoholic solvent such as methanol or ethanol, or in a neutral solvent such as ethyl acetate, to the corresponding amino derivative and reacting the amino derivative with diethyl ethoxymethylenemalonate. Other 10-alkyl derivatives may be prepared by replacing methyl iodide with an equivalent of the appropriate alkyl iodide.

The reaction of a dialkyl [(2-cyanomethyl)anilino] methylenemalonate, for example, diethyl-[(2-cyanomethyl-4,5 - dimethoxy)anilino]methylenemalonate, with suitable base and solvent combinations, such as sodium ethoxide in ethanol, sodium hydride in 1,2-dimethylethane or dimethylformamide, constitutes a novel for preparing a 3-carbalkoxy-pyrimido[1,2-a]indole-2(1H)-one, such as 3-carbethoxy - 7,8 - dimethoxypyrimido[1,2-a]indole-2(1H)-one. Ring closure by this procedure was wholly unexpected. By reason of this unexpected result, a method for preparing the series of novel compounds of this invention was made possible.

The following examples are intended to illustrate, but not to limit, the scope of the invention.

EXAMPLE I

A quantity of (2-amino-4,5-dimethoxy phenyl) acetonitrile (13.1 g.; 0.068 mole) is refluxed with diethyl ethoxymethylenemalonate (14.8 g.; 0.068 mole) in 170 ml. of benzene for two hours. Concentration of the solvent to one-third of its original volume results in separation of a solid which is filtered and recrystallized from benzene. The product obtained is diethyl [(2-cyanomethyl-4,5 - dimethoxy)anilino]methylenemalonate; M.P. 152–153° C. Ultraviolet absorption:

$$\lambda_{max.}^{CH_3OH} \ 221 m\mu \ (\epsilon \ 17,900)$$

320 m$\mu$ ($\epsilon$ 18,600).

EXAMPLE II

To a solution of sodium ethoxide, prepared from 3.2 g. of sodium and 300 ml. of ethanol, is added 50 g. (0.138 mole) of diethyl [(2-cyanomethyl-4,5-dimethoxy)anilino]methylenemalonate as a slurry in 500 ml. of ethanol. The resulting mixture is refluxed for three hours. The separated solid is filtered, the precipitate is dissolved in water and the aqueous solution is rendered acidic (pH 5) with 10 percent hydrochloric acid. Upon standing in the refrigerator overnight, the solution deposits a solid which is filtered and dried. The product is recrystallized twice from dimethylformamide. The product is 3-carbethoxy-7,8-dimethoxypyrimido[1,2-a]indole - 2(1H) - one; M.P. 240–241° C. Ultraviolet absorption:

$$\lambda_{max.}^{CH_3OH} \ 278 \ m\mu \ (\epsilon \ 29,400)$$

299 m$\mu$ ($\epsilon$ 32,700); 337 m$\mu$ ($\epsilon$ 10,400).

EXAMPLE III

A suspension of 9.5 g. (0.03 mole) of 3-carbethoxy-7,8-dimethoxypyrimido[1,2-a]indole-2(1H) - one in 250 ml. of ethanol containing 0.9 g. of platinum oxide is hydrogenated at room temperature. The solid formed is dissolved by heating and the catalyst is filtered off. The filtrate is diluted to 500 ml. with water and cooled. The resulting solid is recovered by filtration. The product is ethyl 1,2,3,4-tetrahydro - 7,8 - dimethoxy-2-oxopyrimido-[1,2-a]indole-3-carboxylate; M.P. 166–166.5° C. Ultraviolet absorption:

$$\lambda_{max.}^{CH_3OH} \ 214 \ m\mu \ (\epsilon \ 23,900)$$

283 m$\mu$ ($\epsilon$ 10,000); 294 m$\mu$ ($\epsilon$ 11,750); 317 m$\mu$ ($\epsilon$ 17,800).

EXAMPLE IV

A 20 g. (0.063 mole) sample of ethyl 1,2,3,4-tetrahydro - 7,8 - dimethoxy - 2 - oxypyrimido[1,2-a]indole-3-carboxylate is dissolved in 300 ml. of ethanol containing 10 ml. of triethylamine. Excess acrylonitrile (75 ml.) is added to the solution. The solution is refluxed for twenty-four hours and then concentrated to dryness. The residual oil is rapidly chromatographed on neutral alumina. Fractions collected with 50 percent ether-chloroform contain the desired product which is then recrystallized from ethyl acetate-cyclohexane. The product is ethyl 1,3-bis(2-cyanoethyl)-1,2,3,4-tetrahydro - 7,8 - dimethoxy-3-oxopyrimido [1,2-a]indole-3-carboxylate; M.P. 117–118° C. Ultraviolet absorption:

$$\lambda_{max.}^{CH_3OH} \ 214 \ m\mu \ (\epsilon \ 24,400)$$

315 m$\mu$ ($\epsilon$ 15,400).

EXAMPLE V

The sodium salt of 3 - carbethoxy - 7,8 - dimethoxy-pyrimido[1,2-a]indole-2(1H)-one (13 g.; 0.038 mole) is suspended in 400 ml. of absolute ethanol. Ethyl bromoacetate (38 g.; 0.228 mole) is added. The reaction mixture is stirred and heated under reflux for one and one-half hours and then is allowed to cool to room temperature. A solid is precipitated. After about one hour, the reaction mixture is filtered. Part of this solid material is recrystallized three times from ethanol. The product obtained is ethyl-3-carbethoxy - 1,2 - dihydro-7,8-dimethoxy-2-oxopyrimido[1,2-a]indole-10-acetate; M.P. 256–260° C. Ultraviolet absorption:

$$\lambda_{max.}^{acetonitrile} \ 230 \ m\mu \ (\epsilon \ 13,900)$$

281 m$\mu$ ($\epsilon$ 26,300); 303 m$\mu$ ($\epsilon$ 31,600); 338 m$\mu$ ($\epsilon$ 10,800).

Other alkyl esters may be prepared by replacing ethyl bromoacetate in the foregoing procedure with an equivalent of the appropriate alkyl bromoacetate.

EXAMPLE VI

Referring to the procedure of Example V, after ethyl 3 - carbethoxy-1,2-dihydro-7,8-dimethoxy-2-oxopyrimido-[1,2-a]indole-10-acetate is removed from the reaction mixture by filtration, the filtrate is allowed to stand overnight at room temperature. The resulting crystals are removed by filtration. The crystals are recrystallized twice from ethanol. The product obtained is ethyl 3-carbethoxy-1,2-dihydro-7,8-dimethoxy - 2 - oxopyrimido[1,2-a]indole-1-acetate; M.P. 208.5–209° C. Ultraviolet absorption:

$$\lambda_{max.}^{acetonitrile} \ 277 \ m\mu \ (\epsilon \ 25,900)$$

300 m$\mu$ ($\epsilon$ 29,800); 335 m$\mu$ ($\epsilon$ 10,400).

EXAMPLE VII

A 2 g. (0.005 mole) quantity of ethyl-3-carbethoxy-1,2-dihydro-7,8-dimethoxy - 2 - oxopyrimido[1,2-a]-indole - 10 - acetate is suspended in 125 ml. of absolute ethanol. Platinum oxide catalyst (0.2 g.; 82+percent) is added. The mixture is hydrogenated at 50 lb. pressure until hydrogen uptake stops (six hours). The suspension is dissolved by adding dimethylformamide and the solution is heated. The catalyst is then removed by filtration. The filtrate is cooled and ether is added. The solid is crystallized from dimethylformamide-water. The product obtained is ethyl 3 - carbethoxy - 1,2,3,4-tetrahydro-7,8-dimethoxy - 2 - oxopyrimido[1,2-a]indole-10-acetate; M.P. 210.5–211.5° C. Ultraviolet absorption:

$\lambda_{max.}^{acetonitrile}$ 223 m$\mu$ ($\epsilon$ 21,400)

282 m$\mu$(sh.); 294 m$\mu$(sh.); 316 m$\mu$($\epsilon$16,300).

EXAMPLE VIII

Ethyl-3-carbethoxy-1,2-dihydro - 7,8 - dimethoxy-2-oxopyrimido[1,2-a]indole-1-acetate (21.5 g.; 0.054 mole) is suspended in 400 ml. monoglyme and stirred until homogeneous. Then 400 ml. of 10 percent HCl is added and the mixture is stirred and heated under reflux for one and one-half hours. The solid material is recovered by filtration and recrystallized from dimethylformamide-water. The product obtained is 3-carbethoxy-1,2-dihydro-7,8-dimethoxy-2-oxopyrimido[1,2-a]indole-1-acetic acid; M.P. 268–269° C. Ultraviolet absorption:

$\lambda_{max.}^{CH_3OH}$ 274 m$\mu$ ($\epsilon$ 31,200)

296 m$\mu$($\epsilon$27,100); 332 m$\mu$($\epsilon$9,780).

EXAMPLE IX 3-carbethoxy - 1,2 - dihydro-7,8 - dimethoxy - 2-oxopyrimido[1,2-a]indole-1-acetic acid (5.2 g.; 0.014 mole) is suspended in 150 ml. water and treated with slightly more than one equivalent of 1 N sodium hydroxide solution. The mixture is stirred for fifteen minutes during which time most of the material goes into solution. The mixture is hydrogenated in a total volume of 200 ml. of water over 0.5 g. of platinum oxide catalyst. The mixture is then filtered. The filtrate is made acidic with HCl and extracted three times with chloroform. The organic material is dried (magnesium sulfate), concentrated and recrystallized from ethyl acetate. The product obtained is 3-carbethoxy-1,2,3,4 - tetrahydro - 7,8-dimethoxy-2-oxopyrimido [1,2-a]indole-1-acetic acid; M.P. 128–129° C. Ultraviolet absorption:

$\lambda_{max.}^{CH_3OH}$ 223 m$\mu$ ($\epsilon$ 20,100)

275 m$\mu$($\epsilon$5,820); 296 m$\mu$($\epsilon$6,590).

EXAMPLE X

Ethyl - 3 - carbethoxy - 1,2 - dihydro - 7,8-dimethoxy-2-oxopyrimdo[1,2-a]indole-1-acetate (10 g.; 0.025 mole) is hydrogenated in 200 ml. of absolute alcohol over 1 g. of platinum oxide catalyst. The resulting solution is filtered. The filtrate is concentrated under reduced pressure. The resulting oil is crystallized when dissolved in ether and benzene. The crystals were recrystallized from ethyl acetate-hexane. The product obtained is ethyl-3-carbethoxy-1,2,3,4-tetrahydro-7,8 - dimethoxy 2-oxopyrimido[1,2-a]-indole-1-acetate; M.P. 96–98° C. Ultraviolet absorption:

$\lambda_{max.}^{CH_3OH}$ 216 m$\mu$ ($\epsilon$ 24,600)

289 m$\mu$(sh); 314 m$\mu$($\epsilon$15,500).

EXAMPLE XI

A 1.15 g. (0.0028 mole) quantity of ethyl 1,3-bis (2-cyanoethyl)-1,2,3,4-tetrahydro - 7,8 - dimethoxy-2-oxopyrimido[1,2-a]indole-3 - carboxylate is saponified by refluxing with 0.12 g. of sodium hydroxide in 30 ml. of aqueous ethanol for five hours. Upon cooling awhile, solid is deposited which is suspended in water and acidified with dilute hydrochloric acid. After the gas evolution ceases, the separated solid is filtered and recrystallized from ethanol-dimethylformamide. The product obtained is 1,2,3,4 - tetrahydro - 7,8 - dimethoxy-2-oxopyrimido-[1,2-a]indole-1,3-propionitrile; M.P. 158–159° C. Ultraviolet absorption:

$\lambda_{max.}^{CH_3OH}$ sh. 282 m$\mu$ ($\epsilon$ 9,500)

291 m$\mu$($\epsilon$11,000); 315 m$\mu$($\epsilon$17,400).

EXAMPLE XII

A 77 g. (0.35 mole) sample of (2-nitro-4,5-dimethoxy phenyl)acetonitrile is alkylated with 70 g. (0.5 mole) of methyl iodide in the presence of 17.5 g. (0.35 mole) of sodium hydride to give $\alpha$-[(2 - nitro - 4,5 - dimethoxyphenyl)]propionitrile; M.P. 135–137° C. This material is reduced with palladium-on-carbon in ethyl acetate to the corresponding amino derivative. The latter is reacted with diethyl ethoxymethylenemalonate. The resulting product is reacted with one equivalent of sodium ethoxide in 150 ml. of ethanol as described in Example II. The product, after recrystallization from dimethylformamide is 3-carbethoxy-7,8-dimethoxy-10 - methyl-pyrimido[1,2-a]indole-2(1H)-one; M.P. 281–282° C. Ultraviolet absorption:

$\lambda_{max.}^{CH_3OH}$ 284 m$\mu$ ($\epsilon$ 18,700)

304 m$\mu$ ($\epsilon$20,600); 335 m$\mu$($\epsilon$10,000).

EXAMPLE XIII

Using the procedure of Example V and replacing ethyl bromoacetate with an equivalent amount of tertiary butyl bromoacetate, the product obtained is tertiary butyl-3-carbethoxy - 1,2 - dihydro-7,8-dimethoxy-2-oxopyrimido-[1,2-a]indole-10-acetate. This compound is reacted with an equivalent amount of p-toluene-sulfonic acid to produce 3-carbethoxy - 1,2 - dihydro - 7,8-dimethoxy-2-oxopyrimido[1,2-a]indole-10-acetic acid.

What is claimed is:
1. A compound selected from the group having the formula:

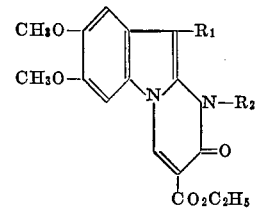

wherein $R_1$ is selected from the group consisting of hydrogen, loweralkyl, —$CH_2CO_2H$, and —$CH_2CO_2$-loweralkyl; and $R_2$ is a member selected from the group consisting of hydrogen, —$CH_2CO_2H$, and

—$CH_2CO_2C_2H_5$ provided that at least one of said $R_1$ and said $R_2$ is hydrogen; and the formula:

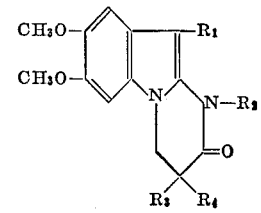

in which $R_1$ is a member selected from the group consisting of hydrogen, loweralkyl, —$CH_2CO_2H$, —$CH_2CO_2$-loweralkyl; $R_2$ is a member selected from the group consisting of hydrogen, —$CH_2CO_2H$, —$CH_2CO_2$-loweralkyl, and —$CH_2CH_2CN$; $R_3$ is a member selected from the group consisting of hydrogen and —$CH_2CH_2CN$; and $R_4$ is a member selected from the group consisting of hydrogen and —CO$_2$C$_2$H$_5$; provided that at least one of said R$_1$ and said R$_2$ is hydrogen; and further provided that said R$_3$ and said R$_4$ are jointly other than hydrogen.

2. 3-carbethoxy - 7,8-dimethoxypyrimido[1,2-a]indole-2(1H)-one.

3. Ethyl 1,2,3,4 - tetrahydro - 7,8-dimethoxy-2-oxopyrimido[1,2-a]indole-3-carboxylate.

4. Ethyl 1,3-bis(2 - cyanoethyl)-1,2,3,4-tetrahydro-7,8-dimethoxy-3-oxopyrimido[1,2-a]indole-3-carboxylate.

5. Ethyl 3-carbethoxy - 1,2 - dihydro-7,8-dimethoxy-2-oxopyrimido[1,2-a]indole-10-acetate.

6. Ethyl 3-carbethoxy-1,2 - dihydro-7,8-dimethoxy-2-oxopyrimido[1,2-a]indole-1-acetate.

7. Ethyl 3-carbethoxy-1,2,3,4 - tetrahydro - 7,8-dimethoxy-2-oxopyrimido[1,2-a]indole-10-acetate.

8. 3-carbethoxy-1,2 - dihydro-7,8-dimethoxy-2-oxopyrimido[1,2-a]indole-1-acetic acid.

9. 3-carbethoxy-1,2,3,4 - tetrahydro - 7,8-dimethoxy-2-oxopyrimido[1,2-a]indole-1-acetic acid.

10. Ethyl-3 - carbethoxy - 1,2,3,4 - tetrahydro-7,8-dimethoxy-2-oxopyrimido[1,2-a]indole-1-acetate.

11. 1,2,3,4-tetrahydro-7,8-dimethoxy - 2-oxopyrimido[1,2-a]indole-1,3-propionitrile.

12. 3-carbethoxy-7,8-dimethoxy - 10-methyl-pyrimido[1,2-a]indole-2(1H)-one.

13. Tertiary butyl-3-carbethoxy - 1,2 - dihydro-7,8-dimethoxy-2-oxopyrimido[1,2-a]indole-10-acetate.

14. 3-carbethoxy-1,2 - dihydro - 7,8-dimethoxy-2-oxopyrimido[1,2-a]indole-10-acetic acid.

15. The process for preparing 3-carbethoxy-7,8-dimethoxypyrimido[1,2-a]indole-2(1H)-one comprising reacting diethyl-[(2 - cyanomethyl-4,5 - dimethoxy)anilino]-methylenemalonate with sodium ethoxide in refluxing ethanol and acidifying the thus-obtained sodium salt of said 3-carbethoxy-7,8-dimethoxy-pyrimido[1,2-a]indole-2(1H)-one.

References Cited

UNITED STATES PATENTS 3,444,181   5/1969   Houlihan _____ 260—309.6

ALEX MAZEL, Primary Examiner

R. V. RUSH, Assistant Examiner

U.S. Cl. X.R.

117—33.3; 252—300; 260—41; 424—60

PO-1050
(5/69)

UNITED STATES PATENT OFFICE
CERTIFICATE OF CORRECTION

Patent No. 3,546,225  Dated December 8, 1970

Inventor(s) Vasken Paragamian

It is certified that error appears in the above-identified patent and that said Letters Patent are hereby corrected as shown below:

In the Title, "Oxopyrimido" should read --Oxo-Pyrimido--.
Alongside the first formula insert --(Formula I)--.
In Column 3, line 40, insert --method-- after "novel".

SIGNED AND
SEALED
MAR 2 1971

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,546,225      Dated December 8, 1970

Inventor(s) Vasken Paragamian

It is certified that error appears in the above-identified patent and that said Letters Patent are hereby corrected as shown below:

In the Title, " Oxopyrimido" should read --Oxo-Pyrimido--.
Alongside the first formula insert --(Formula I)--.
In Column 3, line 40, insert --method-- after "novel ".

SIGNED AND
SEALED
MAR 2 1971

(SEAL)
Attest:

Edward M. Fletcher, Jr.
Attesting Officer

WILLIAM E. SCHUYLER, J
Commissioner of Patent